(12) United States Patent
Cohen

(10) Patent No.: US 10,536,024 B2
(45) Date of Patent: Jan. 14, 2020

(54) BATTERY CHARGING SYSTEM

(71) Applicant: TEXAS INSTRUMENTS INCORPORATED, Dallas, TX (US)

(72) Inventor: Isaac Cohen, Dix Hills, NY (US)

(73) Assignee: Texas Instruments Incorporated, Dallas, TX (US)

( * ) Notice: Subject to any disclaimer, the term of this patent is extended or adjusted under 35 U.S.C. 154(b) by 412 days.

(21) Appl. No.: 15/340,655

(22) Filed: Nov. 1, 2016

(65) Prior Publication Data

US 2017/0207645 A1 Jul. 20, 2017

Related U.S. Application Data

(60) Provisional application No. 62/280,512, filed on Jan. 19, 2016.

(51) Int. Cl.
*H02J 7/04* (2006.01)
*H02J 7/00* (2006.01)

(52) U.S. Cl.
CPC .............. *H02J 7/04* (2013.01); *H02J 7/0052* (2013.01); *H02J 2007/0062* (2013.01)

(58) Field of Classification Search
USPC ......................................................... 320/114
See application file for complete search history.

(56) References Cited

U.S. PATENT DOCUMENTS

| | | | |
|---|---|---|---|
| 2011/0068626 A1* | 3/2011 | Terlizzi | H02J 1/08 307/32 |
| 2012/0106216 A1* | 5/2012 | Tzinker | H02M 1/4225 363/126 |
| 2015/0138839 A1* | 5/2015 | Seok | H02M 3/33553 363/17 |

* cited by examiner

*Primary Examiner* — Robert Grant
(74) *Attorney, Agent, or Firm* — Tuenlap Chan; Charles A. Brill; Frank D. Cimino

(57) ABSTRACT

One example includes a battery charging system configured to charge a battery associated with a mobile device. The battery charging system includes a transformer configured to receive an AC charging current via a charging cable at a primary inductor and to generate an AC secondary current at a secondary inductor. The battery charging system also includes a rectifier system configured to rectify and filter the AC secondary current to generate a DC charging current that is provided to charge the battery.

11 Claims, 3 Drawing Sheets

BATTERY CHARGING SYSTEM

RELATED APPLICATIONS

This application claims priority from U.S. Provisional Application Ser. No. 62/280,512, filed 19 Jan. 2016, which is incorporated herein in its entirety.

TECHNICAL FIELD

This disclosure relates generally to electronic systems, and more specifically to a battery charging system.

BACKGROUND

Wireless electronic devices, such as wireless communications devices (e.g., smart-phones), laptop computers, and tablet computers, are becoming more prevalent in modern consumer culture. Such devices are battery-powered, and thus require periodic charging to maintain sufficient battery voltage to operate the respective device. Charging a wireless device typically involves providing a DC voltage via a charging cable (e.g., a universal serial bus (USB) cable), which can take a considerable amount of time to charge fully (e.g., more than an hour from approximately zero volts). Charging a device in significantly less time can be accomplished by delivering a very high current, which is impractical or prohibitive with connector and cable dimensions of typical mobile devices. Alternatively, a very high voltage can be implemented, but such a charging system would require a highly inefficient step-down DC-DC converter, as well as significantly large circuit components in the mobile device.

SUMMARY

One example includes a battery charging system configured to charge a battery associated with a mobile device. The battery charging system includes a transformer configured to receive an AC charging current via a charging cable at a primary inductor and to generate an AC secondary current at a secondary inductor. The battery charging system also includes a rectifier system configured to rectify and filter the AC secondary current to generate a DC charging current that is provided to charge the battery.

Another example includes a method for charging a battery associated with a mobile device. The method includes receiving a power voltage at an AC adapter and generating an AC charging current based on the power voltage via a programmable AC current source associated with the AC adapter. The AC charging current can be provided on a first conductor of a charging cable that interconnects the AC adapter and the mobile device. The method also includes receiving a control voltage on a second conductor of the charging cable. The control voltage can include a voltage associated with the AC charging current and a DC feedback control voltage. The method further includes adjusting an amplitude of the AC charging current based on an amplitude of the DC feedback control voltage.

Another example includes a battery charging system. The system includes an AC adapter comprising a programmable AC current source configured to generate an AC charging current having an amplitude that is based on an amplitude of a DC feedback control voltage. The system also includes a device power system associated with a mobile device. The device power system includes a transformer configured to receive the AC charging current via a first conductor of a charging cable at a primary inductor and to generate an AC secondary current at a secondary inductor. The device power system also includes a rectifier system configured to rectify the AC secondary current to generate a DC charging current that is provided to charge a battery associated with the mobile device. The device power system further includes a charge controller configured to monitor an amplitude of a battery voltage and an amplitude of the AC charging current and to generate the DC feedback control voltage that is provided to the AC adapter via a second conductor of the charging cable.

DETAILED DESCRIPTION

This disclosure relates generally to electronic systems, and more specifically to a battery charging system. The battery charging system includes an AC adapter that can receive a power voltage (e.g., an AC line voltage) and is configured to generate a high-frequency (e.g., greater than approximately 500 kHz) AC charging current. The AC adapter can include a programmable AC current source to generate the AC charging current, such that the programmable AC current source can generate the AC charging current at an amplitude that is based on a DC feedback control voltage. The AC charging current is provided to the mobile device via a first conductor of a charging cable (e.g., a universal serial bus (USB) cable, such as a USB Type-C cable).

The mobile device includes a device power system that receives the AC charging current via the charging cable. The AC charging current is provided through a primary inductor of a transformer to generate an AC secondary current via a secondary inductor of the transformer. The AC secondary current is rectified and filtered to generate a DC charging current that is provided to charge the battery of the mobile device. In addition, the device power system includes a charge controller that monitors an amplitude of the AC charging current and an amplitude of the battery voltage, and generates the DC feedback control voltage at an amplitude that is based on the amplitudes of the AC charging current and the battery voltage. The DC feedback control voltage is added to the AC charging current on a second conductor of the charging cable, between isolation capacitors associated with the AC adapter and the device power system, respectively, such that the DC feedback control voltage can be provided to the programmable AC current source to set the amplitude of the AC charging current in a feedback manner.

Figure 1:
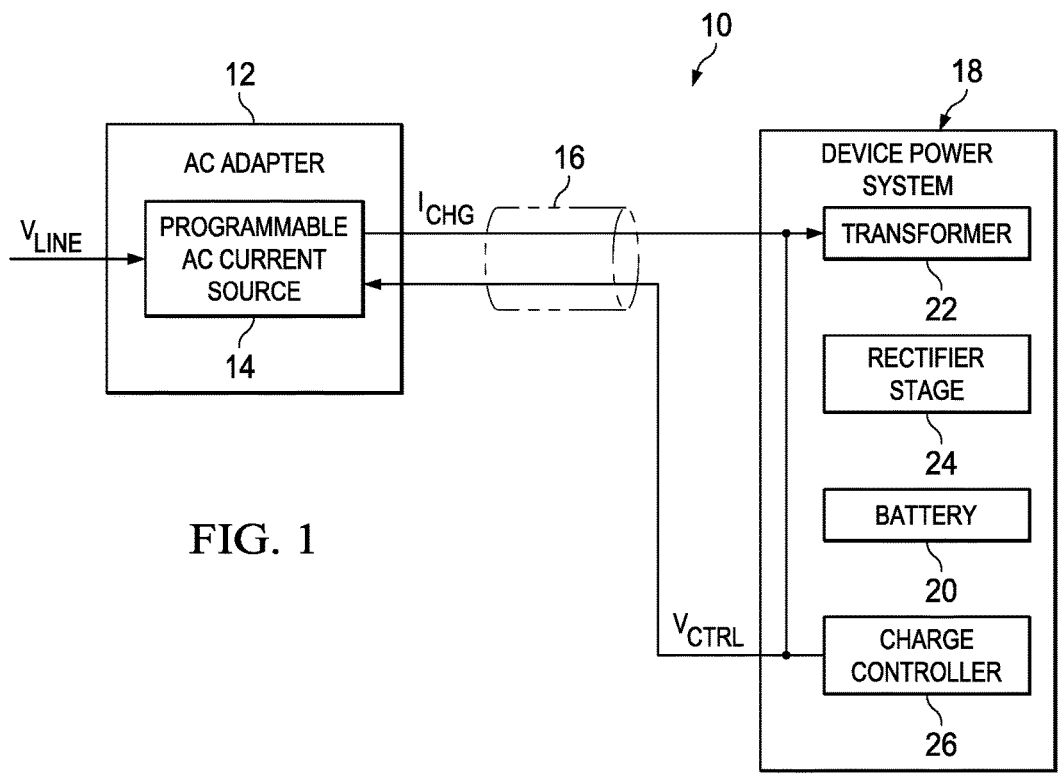
FIG. 1 illustrates an example of a battery charging system.

FIG. 1 illustrates an example of a battery charging system 10. The battery charging system 10 can be implemented for charging a battery associated with a variety of different types of mobile devices, such as smart phones, laptop computers, tablet computers, or a variety of other wireless devices. As described herein, the battery charging system 10 can implement very fast charging of the battery (e.g., 1500 mA/h), such as to charge a battery to approximately 50% of battery capacity within approximately five minutes.

The battery charging system 10 includes an AC adapter 12 that is configured to generate an AC charging current $I_{CHG}$ in response to a power voltage $V_{LINE}$. As an example, the power voltage $V_{LINE}$ can be an AC line voltage that is provided, for example, from a public utility power grid. In the example of FIG. 1, the AC adapter 12 includes a programmable AC current source 14 that is configured to generate the AC charging current $I_{CHG}$ in response to a control voltage $V_{CTRL}$. As an example, the AC charging current $I_{CHG}$ can have a high frequency (e.g., greater than approximately 500 kHz). As described in greater detail herein, the control voltage $V_{CTRL}$ can correspond to a voltage associated with the AC charging current $I_{CHG}$ and a DC feedback control voltage. Thus, the programmable AC current source 14 can generate the AC charging current $I_{CHG}$ to have an amplitude that is based on an amplitude of the DC feedback control voltage component.

The AC charging current $I_{CHG}$ is provided on a first conductor of a charging cable 16 that interconnects the AC adapter 12 and a device power system 18. As an example, the charging cable 16 can be configured as a universal serial bus (USB) cable (e.g., a USB Type-C cable). For example, the device power system 18 can be provided in the respective mobile device, such that the charging cable 16 can plug into the mobile device to interact with the device power system 18 to charge a battery 20 associated with the device power system 18. The device power system 18 includes a transformer 22 that is configured to isolate the AC charging current $I_{CHG}$ from the battery 20 by generating an AC secondary current. The AC secondary current is rectified and filtered by a rectifier stage 24 to generate a DC charging current that charges the battery 20. Based on the high frequency and high amplitude of the AC charging current $I_{CHG}$, the DC charging current can provide very rapid charging of the battery 20.

The device power system 18 also includes a charge controller 26 that is configured to provide feedback control of the AC charging current $I_{CHG}$. As an example, the charge controller 26 can be configured to monitor an amplitude of both the AC charging current $I_{CHG}$ and the battery voltage, and can generate a DC feedback control voltage. The DC feedback control voltage can be added to the voltage associated with the AC charging current $I_{CHG}$ to provide the control voltage $V_{CTRL}$ that is provided to the AC adapter 12 via a second conductor of the charging cable 16. The programmable AC current source 14 can thus adjust an amplitude of the AC charging current $I_{CHG}$ based on an amplitude of the DC feedback control voltage in the control voltage $V_{CTRL}$. Accordingly, the programmable AC current source 14 can be configured to generate the AC charging current $I_{CHG}$ in a feedback manner to provide rapid charging of the battery 20.

Figure 2:
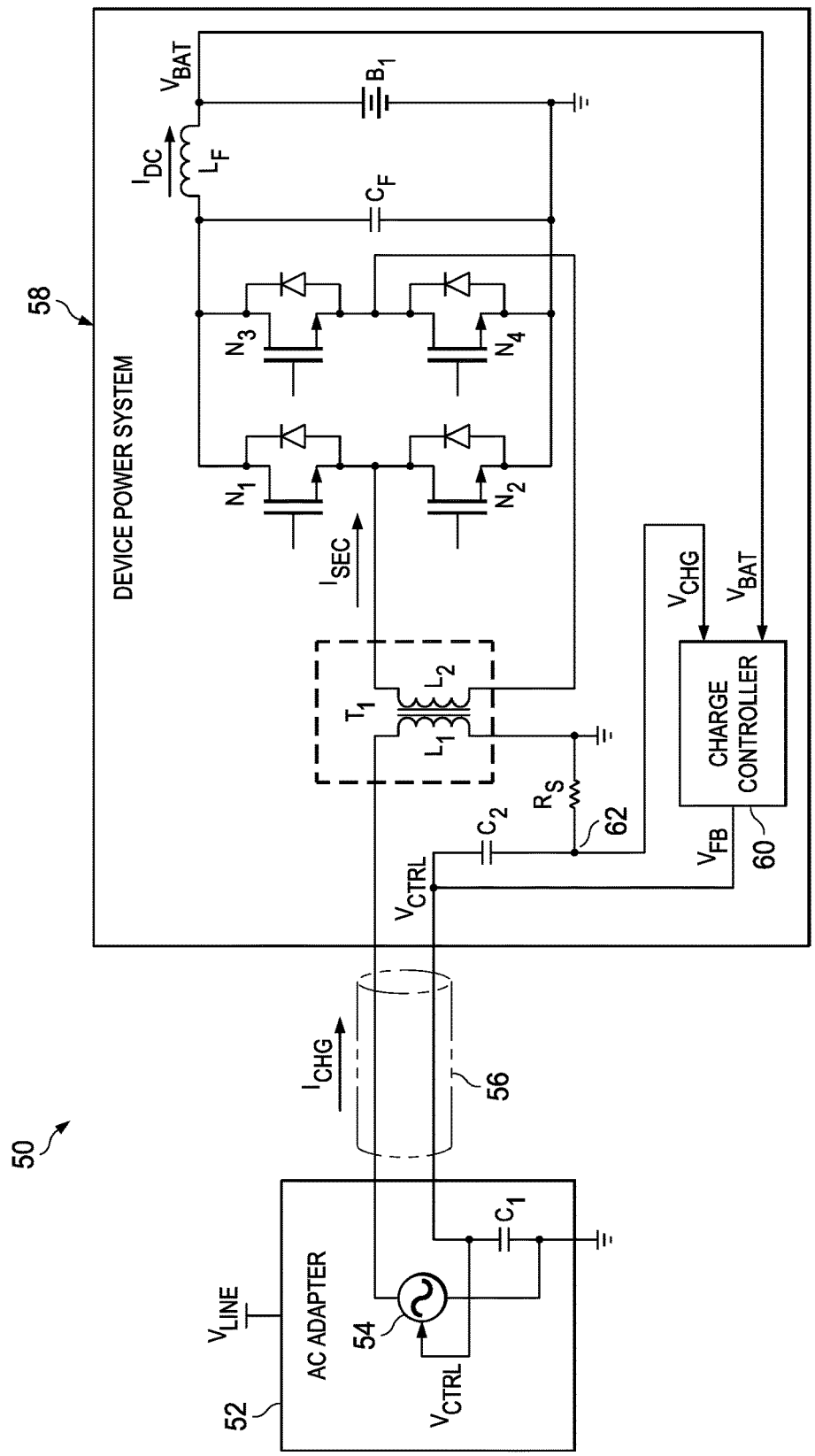
FIG. 2 illustrates another example of a battery charging system.

FIG. 2 illustrates another example of a battery charging system 50. The battery charging system 50 can correspond to a more detailed example of the battery charging system 10 in the example of FIG. 1. Thus, the battery charging system 50 can be implemented for charging a battery associated with a variety of different types of mobile devices, such as smart phones, laptop computers, tablet computers, or a variety of other wireless devices in a very rapid manner.

The battery charging system 50 includes an AC adapter 52 that is configured to generate an AC charging current $I_{CHG}$ in response to a power voltage $V_{LINE}$. As an example, the power voltage $V_{LINE}$ can be an AC line voltage that is provided, for example, from a public utility power grid. In the example of FIG. 2, the AC adapter 52 includes a programmable AC current source 54 that is configured to generate the AC charging current $I_{CHG}$. For example, the programmable AC current source 54 can have a compliance range that can span from zero volts to approximately 40 volts RMS open-circuit, and can be deactivated by the AC adapter 52 in response to an open-circuit condition. As an example, the AC charging current $I_{CHG}$ can have a high frequency (e.g., greater than approximately 500 kHz), and can have a sinusoidal or other waveform shape. The AC charging current $I_{CHG}$ is provided on a first conductor of a charging cable 56 that can correspond to any of a variety of typical charging cables, such as a USB cable (e.g., a USB Type-C cable).

In the example of FIG. 2, the programmable AC current source 54 is configured to generate the AC charging current based on a control voltage $V_{CTRL}$. As described in greater detail herein, the control voltage $V_{CTRL}$ can correspond to a voltage associated with the AC charging current and with a DC feedback control voltage $V_{FB}$. In the example of FIG. 2, the AC adapter 52 includes an isolation capacitor $C_1$ that interconnects a second conductor of the charging cable 56 and a low-voltage power rail, demonstrated in the example of FIG. 2 as ground. Therefore, the programmable AC current source 54 can generate the AC charging current $I_{CHG}$ to have an amplitude that is based on an amplitude of the DC feedback control voltage $V_{FB}$, which can correspond to an average voltage across the isolation capacitor $C_1$.

The charging cable 56 interconnects the AC adapter 52 and a device power system 58 that can be located in the respective mobile device. Therefore, the charging cable 56 can be plugged into the mobile device to charge a battery $B_1$ associated with the device power system 58. In the example of FIG. 2, the device power system 58 includes a transformer $T_1$ that includes a primary inductor $L_1$ and a secondary inductor $L_2$ that are magnetically coupled. The AC charging current $I_{CHG}$ is provided from the first conductor of the charging cable 56 to the primary inductor $L_1$, which thus induces an AC secondary current $I_{SEC}$ in the secondary inductor $L_2$. Thus, the transformer $T_1$ provides isolation of the AC charging current $I_{CHG}$ and the battery $B_1$, such that the battery $B_1$ and/or other components of the device power system 58 are protected from short circuits associated with the AC charging current $I_{CHG}$. Accordingly, the transformer $T_1$ of the device power system 58 obviates the need for disconnect/isolation switches at the connection pins associated with the charging cable 56.

The AC secondary current $I_{SEC}$ is provided through a rectifier. In the example of FIG. 2, the rectifier is formed by a set of transistors $N_1$, $N_2$, $N_3$, and $N_4$ that can operate as a synchronous bridge, such that the transistors $N_1$, $N_2$, $N_3$, and $N_4$ can be switched in response to zero current across the respective transistors $N_1$, $N_2$, $N_3$, and $N_4$. The rectified AC secondary current $I_{SEC}$ is filtered via an LC filter formed by an inductor $L_F$ and a capacitor $C_F$ to generate a DC charging current $I_{DC}$. The DC charging current $I_{DC}$ can thus be provided to charge the battery $B_1$. While the rectifier stage in the example of FIG. 2 is demonstrated as a combination of the synchronous bridge formed by the transistors $N_1$, $N_2$, $N_3$, and $N_4$ and the LC filter formed by the inductor $L_F$ and the capacitor $C_F$ (e.g., collectively corresponding to the rectifier stage 24 in the example of FIG. 1), it is to be understood that other rectifiers and/or filters can be implemented to generate the DC charging current $I_{DC}$ based on the AC secondary current $I_{SEC}$.

The device power system 58 also includes a charge controller 60 that is configured to provide feedback control of the AC charging current $I_{CHG}$. In the example of FIG. 2, the charge controller 60 is configured to monitor an amplitude of a battery voltage $V_{BAT}$ and an amplitude of the AC charging current $I_{CHG}$ based on a charging voltage $V_{CHG}$. The device power system 58 includes a sense resistor $R_S$ that is coupled to the primary inductor $L_1$ and ground, such that the charge controller 60 monitors the charge voltage $V_{CHG}$ at a monitoring node 62 that is coupled to the other end of the sense resistor $R_S$. Thus, the charging voltage $V_{CHG}$ has an amplitude that is proportional to the amplitude of the charging current $I_{CHG}$ through the primary inductor $L_1$. In response to the battery voltage $V_{BAT}$ and the charging voltage $V_{CHG}$, the charge controller generates the DC feedback control voltage $V_{FB}$ that has an amplitude based on a desired amplitude of the charging current $I_{CHG}$ based on a continuous amplitude of the battery voltage $V_{BAT}$.

The device power system 58 also includes an isolation capacitor $C_2$ that interconnects the monitoring node 62 and the second conductor of the charging cable 56. In the example of FIG. 2, the charge controller 60 provides the DC feedback control voltage $V_{FB}$ to the second conductor of the charging cable 56, which is thus added to the charging voltage $V_{CHG}$ via the isolation capacitor $C_2$ to generate the control voltage $V_{CTRL}$. Therefore, because the isolation capacitor $C_2$ provides DC blocking capability, the DC feedback control voltage $V_{FB}$ does not affect the amplitude of the charging voltage $V_{CHG}$. The control voltage $V_{CTRL}$ is thus provided to the AC adapter 52, and is thus provided to the programmable AC current source 54. Therefore, the programmable AC current source 54 can set the amplitude of the AC charging current $I_{CHG}$ based on the control voltage $V_{CTRL}$ in a feedback manner. Particularly, an average voltage across the isolation capacitor $C_1$ in the AC adapter 52 can correspond to the DC feedback control voltage $V_{FB}$ based on the DC blocking capability of the isolation capacitor $C_1$. Accordingly, the programmable AC current source 54 can provide the AC charging current $I_{CHG}$ at an amplitude that corresponds to the requested amplitude as provided by the amplitude of the DC feedback control voltage $V_{FB}$ provided by the charge controller 60. Accordingly, the battery $B_1$ can be charged rapidly in a closed-loop manner based on the programmable AC current source 54 generating the AC charging current $I_{CHG}$ at an amplitude that is dictated by the amplitude of the battery voltage $V_{BAT}$.

The battery charging system 50 can be implemented to charge any of a variety of electronic devices, and can implement any of a variety of different types of charging cables for the charging cable 56. As described previously, the charging cable 56 can be implemented as a USB cable, such that existing designs for USB cables and associated connectors can be used. As an example, one or more of the pins of existing USB cable and connector designs can be left unused, or can be used for additional control purposes unrelated to charging of the battery $B_1$. Additionally, because the battery charging system 50 implements charging based on an AC charging current $I_{CHG}$, the polarity of the charging cable 56 is irrelevant. Particularly, changing the polarity of the charging cable 56 can change the polarity of the control voltage $V_{CTRL}$, but given that the programmable AC current source 54 can monitor the absolute value of the control voltage $V_{CTRL}$ (e.g., based on the average voltage across the isolation capacitor $C_1$ corresponding to the DC feedback control voltage $V_{FB}$), the polarity of the control voltage $V_{CTRL}$, and thus the charging cable 56, is irrelevant. Furthermore, because of the simplified two-conductor connection between the AC adapter 52 and the device power system 58, legacy USB cables, such as a USB Type-C cable, can be used in the battery charging system 50 to provide backward compatibility with existing charging cables.

Figure 3:
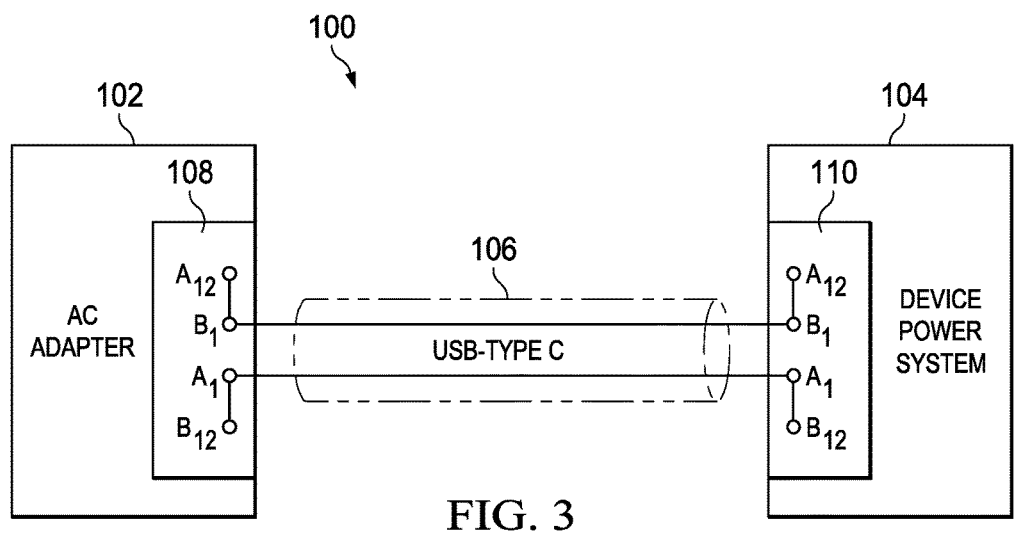
FIG. 3 illustrates yet another example of a battery charging system.

FIG. 3 illustrates yet another example of a battery charging system 100. The battery charging system 100 can correspond to either of the battery charging systems 10 and 50 in the respective examples of FIGS. 1 and 2. The battery charging system 100 includes an AC adapter 102 and a device power system 104. The AC adapter 102 can be configured substantially the same as the AC adapter 52, and can thus include a programmable AC current source configured to generate an AC charging current based on a control voltage. Similarly, the device power system 104 can be configured substantially the same as the device power system 58, and can thus be configured to convert the AC charging current to a DC charging current to charge the battery, and can generate the DC feedback control voltage that is provided back to the AC adapter via the control voltage.

In the example of FIG. 3, the battery charging system 100 includes a USB-Type C cable 106 that interconnects the AC adapter 102 and the device power system 104. The USB-Type C cable 106 can implement a connection of two conductors between the AC adapter 102 and the device power system 104, such that the first conductor can provide the AC charging current from the AC adapter 102 to the device power system 104 and the second conductor can provide the control voltage from the device power system 104 to the AC adapter 102. In the example of FIG. 3, the USB-Type C cable 106 is demonstrated as having a coupling of an $A_{12}$ pin and a $B_1$ pin at each of a connector 108 associated with the AC adapter 102 and a connector 110 associated with the device power system 104. Similarly, the USB-Type C cable 106 is demonstrated as having a coupling of an $A_1$ pin and a $B_{12}$ pin at each of the connector 108 and the connector 110. The respective $A_1$ and $B_{12}$ pins and $A_{12}$ and $B_1$ pins can be electrically coupled (i.e., shorted) in either the respective connectors 108 and 110 or in the USB-Type C cable 106 itself.

As an example, the AC charging current can have a maximum amplitude of 36 volts RMS, such that the AC adapter 102 can deliver 32 watts per ampere RMS. For an AC resistance at 1 MHz that is four times greater than the respective DC resistance of the USB-Type C cable 106, the current rating of the USB-Type C cable 106 can be de-rated by a factor of two. Therefore, assuming an approximately 90% power delivery efficiency, the USB-Type C cable 106 can be configured to deliver approximately 36 watts for a five ampere rating of the USB-Type C cable 106, or to deliver approximately 21.6 watts for a three ampere rating of the USB-Type C cable 106. Therefore, the USB-Type C cable 106 can be implemented as described herein to provide more rapid charging of a battery of a mobile device relative to typical battery charging systems without requiring a cable adapted for use with the battery charging system 50, as described herein. Alternatively, a cable with a higher power rating can be used in the battery charging system 50, as described herein, to provide even more rapid battery charging.

Figure 4:
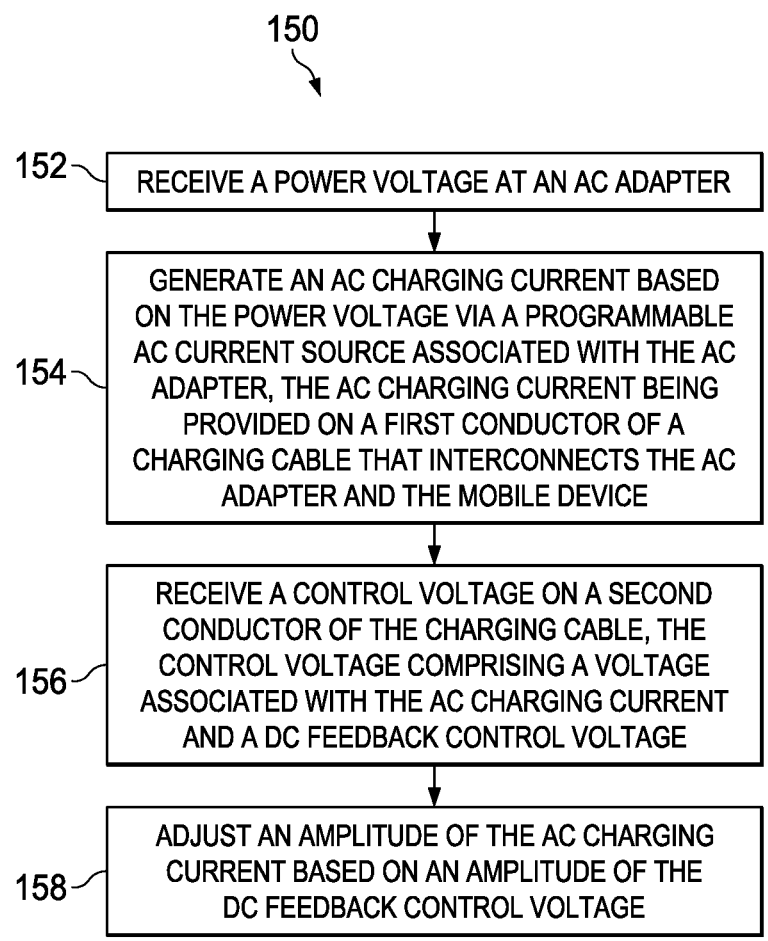
FIG. 4 illustrates an example of a method for charging a battery associated with a mobile device.

In view of the foregoing structural and functional features described above, a method in accordance with various aspects of the present disclosure will be better appreciated with reference to FIG. 4. While, for purposes of simplicity of explanation, the method of FIG. 4 is shown and described as executing serially, it is to be understood and appreciated that the present disclosure is not limited by the illustrated order, as some aspects could, in accordance with the present disclosure, occur in different orders and/or concurrently with other aspects from that shown and described herein. Moreover, not all illustrated features may be required to implement a method in accordance with an aspect of the present disclosure.

FIG. 4 illustrates a method 150 for charging a battery (e.g., the battery 20) associated with a mobile device. At 152, a power voltage (e.g., the voltage $V_{LINE}$) is received at an AC adapter (e.g., the AC adapter 12). At 154, an AC charging current (e.g., the AC charging current $I_{CHG}$) is generated based on the power voltage via a programmable AC current source (e.g., the programmable AC current source 14) associated with the AC adapter. The AC charging current can be provided on a first conductor of a charging cable (e.g., the charging cable 16) that interconnects the AC adapter and the mobile device. At 156, a control voltage (e.g., the control voltage $V_{CTRL}$) is received on a second conductor of the charging cable. The control voltage can include a voltage associated with the AC charging current (e.g., the charging voltage $V_{CHG}$) and a DC feedback control voltage (e.g., the DC feedback control voltage $V_{FB}$). At 158, an amplitude of the AC charging current is adjusted based on an amplitude of the DC feedback control voltage.

What have been described above are examples of the disclosure. It is, of course, not possible to describe every conceivable combination of components or method for purposes of describing the disclosure, but one of ordinary skill in the art will recognize that many further combinations and permutations of the disclosure are possible. Accordingly, the disclosure is intended to embrace all such alterations, modifications, and variations that fall within the scope of this application, including the appended claims.

What is claimed is:

1. A method for charging a battery associated with a mobile device, the method comprising:
   receiving a power voltage at an AC adapter;
   generating an AC charging current based on the power voltage via a programmable AC current source associated with the AC adapter, the AC charging current being provided on a first conductor of a charging cable that interconnects the AC adapter and the mobile device;
   receiving a control voltage on a second conductor of the charging cable, the control voltage comprising a voltage associated with the AC charging current and a DC feedback control voltage; and
   adjusting an amplitude of the AC charging current based on an amplitude of the DC feedback control voltage.

2. The method of claim 1, wherein generating the AC charging current comprises generating the AC charging current at a frequency that is greater than 500 kHz.

3. The method of claim 1, further comprising:
   receiving the AC charging current via the charging cable at a primary inductor of a transformer associated with the mobile device;
   generating an AC secondary current via a secondary inductor of the transformer; and
   rectifying and filtering the AC secondary current to generate a DC charging current that is provided to charge the battery.

4. The method of claim 1, further comprising:
   monitoring an amplitude of a battery voltage associated with the battery;
   monitoring an amplitude of the AC charging current; and
   generating the DC feedback control voltage at an amplitude that is based on the amplitude of the battery voltage and the amplitude of the AC charging current.

5. The method of claim 1, further comprising combining the DC feedback control voltage and the voltage associated with the AC charging current on the second conductor of the charging cable that interconnects a first isolation capacitor associated with the AC adapter and a second isolation capacitor associated with the mobile device, wherein adjusting the amplitude of the AC charging current comprises adjusting the amplitude of the AC charging current based on an average voltage across the first isolation capacitor that corresponds to the DC feedback control voltage.

6. A battery charging system comprising:
   an AC adapter comprising a programmable AC current source configured to generate an AC charging current having an amplitude that is based on an amplitude of a DC feedback control voltage; and
   a device power system associated with a mobile device, the device power system comprising:
      a transformer configured to receive the AC charging current via a first conductor of a charging cable at a primary inductor and to generate an AC secondary current at a secondary inductor;
      a rectifier system configured to rectify the AC secondary current to generate a DC charging current that is provided to charge a battery associated with the mobile device; and
      a charge controller configured to monitor an amplitude of a battery voltage and an amplitude of the AC charging current and to generate the DC feedback control voltage that is provided to the AC adapter via a second conductor of the charging cable.

7. The system of claim 6, wherein the charge controller is configured to monitor the amplitude of the AC charging current based on monitoring a voltage associated with the AC charging current at a monitoring node, the device power system further comprising an isolation capacitor that interconnects the second conductor of the charging cable and the monitoring node, such that the charge controller adds the DC feedback control voltage to the voltage associated with the AC charging current at the second conductor of the charging cable.

8. The system of claim 6, wherein the AC adapter further comprises an isolation capacitor that interconnects a second conductor of the charging cable and a low-voltage power rail associated with the programmable AC current source, wherein the programmable AC current source is configured to receive a control voltage on the second conductor of the charging cable, the control voltage comprising a voltage associated with the AC charging current and the DC feedback control component, the programmable AC current source being configured to generate the AC feedback control voltage in a feedback manner based on an average voltage amplitude across the isolation capacitor corresponding to the DC feedback control voltage.

9. The system of claim 6, wherein the charging cable is configured as a universal serial bus (USB) Type-C cable comprising a first connector coupled to the AC adapter and a second connector coupled to the mobile device, wherein an $A_{I2}$ pin and a $B_1$ pin are electrically coupled at each of the first connector and the second connector, and wherein an $A_I$ pin and a $B_{12}$ pin are electrically coupled at each of the first connector and the second connector.

10. The system of claim 6, wherein the rectifier system comprises:
   a plurality of transistors arranged as a synchronous rectifier bridge configured to rectify the AC secondary current; and
   an LC filter configured to generate the DC charging current based on the rectified AC secondary current.

11. The system of claim 6, wherein the AC charging current is generated at a frequency that is greater than 500 kHz.

\* \* \* \* \*